3,194,790
COPOLYMERS OF FORMALDEHYDE AND VINYL-
NITROGEN COMPOUNDS
Northrop Brown, Wilmington, Del., assignor to E. I. du
Pont de Nemours and Company, Wilmington, Del., a
corporation of Delaware
No Drawing. Filed June 13, 1960, Ser. No. 35,420
8 Claims. (Cl. 260—67.5)

This invention relates to novel and useful compositions of matter and to their preparation, and, more particularly, it relates to copolymers of formaldehyde and vinyl-nitrogen compounds.

In U.S. Patent 2,768,994 issued October 30, 1956, to R. N. MacDonald there is described and claimed a polymer of formaldehyde, called a "polyoxymethylene," which has excellent toughness and thermal stability. Heretofore very little has been known about the copolymerization of formaldehyde with other comonomers to produce a product having the polyoxymethylene structure as described in the above-mentioned MacDonald patent and as modified by the presence of comonomer units in the polymer chain. The present invention provides as a novel composition of matter a copolymer of formaldehyde and vinyl-nitrogen compounds, such as vinyl amines, vinyl amides, and vinyl imides.

It is an object of this invention to provide a copolymer of formaldehyde and a vinyl-nitrogen compound as a novel composition of matter. It is another object of this invention to provide a copolymer of formaldehyde which has a thermal stability comparable to polyoxymethylene and has different strength properties than polyoxymethylene, depending upon the amount and kind of comonomer in the copolymer. It is another object of this invention to provide a process for preparing the aforementioned copolymers. Still other objects will become apparent to those skilled in the art as the details of this invention are more fully described hereinafter.

The above objects are accomplished in accordance with this invention by contacting formaldehyde and a vinyl-nitrogen comonomer in the presence of a Friedel-Crafts metal halide catalyst and an inert liquid solvent at a temperature from about −80° C. to +100° C. for a time sufficient to permit solid particles of a copolymer of formaldehyde and the said vinyl-nitrogen compound to be formed. In the preferred method of operation tin tetrabromide is dissolved in a liquid hydrogen containing 3–10 carbon atoms, the tin tetrabromide being present in the amount of 0.001 to 5.0 millimoles per liter of hydrocarbon reaction medium. Into this reaction medium maintained at a temperature of about 0° to 75° C. there is introduced a mixture of formaldehyde and a vinyl-nitrogen compound, such as an N-vinylamide, an N-vinylamine, or an N-vinylimide, in a mol ratio of about 0.5 to 500 mols of the vinyl-nitrogen compound per 1000 mols of formaldehyde. After a short reaction period of not more than about 30 minutes, sufficient copolymeric solids have formed to produce a dispersion having 0.5–10% by weight of solids. This dispersion is then filtered, washed, and dried to produce a normally solid copolymer of formaldehyde and the vinyl-nitrogen compound containing from about 0.5 to 50 mols of vinyl-nitrogen compound per 1000 mols of formaldehyde.

The vinyl-nitrogen compound employed as a comonomer in this invention may be represented by either of the two formulas:

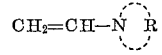

and

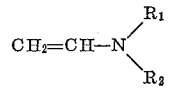

wherein R is a divalent cyclic organic radical containing 3–12 carbon atoms and connected to the nitrogen of the above formula through two separate and distinct carbon atoms in the cyclic structure of the radical, and wherein $R_1$ and $R_2$ are monovalent organic radicals containing 1–12 carbon atoms and being selected from the group consisting of alkyl, cycloalkyl, aryl, and the radical having the formula

in which $R_3$ is a monovalent radical selected from the group consisting of hydrogen, alkyl radicals of 1–12 carbon atoms, cycloalkyl radicals of 4–6 carbon atoms, and aryl radicals of 6–12 carbon atoms. The preferred compounds are the N-vinyl-amines and the N-vinylamides. The copolymer composition of the present invention contains from 0.5 to 50 mols of the vinyl-nitrogen compound per 1000 mols of formaldehyde.

The particular compounds intended to be encompassed by the above formulas include, but are not limited to N-vinyl-alpha-pyrrolidone;
N-vinyl-alpha-methylpyrrolidone;
N-vinyl-para-tolyl-alpha-naphthylamine;
N-vinylcarbazole;
N-vinylalkylformamides; e.g.
N-vinyl N-methylformamide;
N-vinylalkylacetamides;
N-vinylalkylpropionamides;
N-vinyl N-cyclohexylacetamide;
N-vinylsuccinimide;
N-vinylphthalimide;
N-vinylpyrrolidine;
N-vinylpiperidine;
vinyldiphenylamine;
vinyldibutylamine;
N-vinylindole;
N-vinylpyrrole;
N-vinyl-epsilon-caprolactam;
N-vinyl-beta-propionolactam; and the like.

This invention may be more fully understood by reference to the following illustrative examples. Parts and percentages are by weight unless otherwise specified. Inherent viscosities are measured in either of two solvents-dimethylformamide or phenol. In the case of dimethylformamide, the inherent viscosity is measured at 150° C. on a solution of 0.5 gram of polymer in 100 ml. of dimethylformamide containing one gram of diphenylamine. In the case of phenol, the inherent viscosity is measured at 90° C. on a solution of 0.5 gram of polymer in 100 ml. of phenol. The relationship between inherent viscosity as measured in these two systems is approximately such that the inherent viscosity in dimethylformamide is equivalent to 0.60 times the inherent viscosity in phenol. The formula for inherent viscosity is that reported by L. H. Cragg in "Journal of Colloid Science," volume 1, pages 261–9 (May 1946) and is expressed as follows:

$$\text{Inherent viscosity} = \frac{\ln \text{relative viscosity}}{C}$$

where relative viscosity equals ratio of solution viscosity to solvent viscosity and C equals concentration of solute in solution (grams of polymer per 100 ml. of solution). The relationship between inherent viscosity and number average molecular weight is such that an inherent viscosity in phenol of about 1.0 is equal to a number average molecular weight of about 30,000. The analysis for the number of vinyl-nitrogen comonomer units in the copolymer was accomplished by one or more of the following techniques:

(1) Chemical analysis for elemental nitrogen, and
(2) Infrared analysis, e.g., at wave-lengths of about 6.0 microns for the characteristic amide carbonyl absorption band, and at 2.54 microns for the reference, this analysis being calibrated against the technique of (1).

*Example 1*

Formaldehyde was copolymerized with N-vinylcarbazole in a continuous process. The polymerization reactor was a four-neck, 1 liter flask having a liquid overflow line in the bottom of the flask. The flask was equipped with a thermometer, a stirrer, an inlet line for formaldehyde monomer vapors, a liquid inlet line for the reaction medium, an inlet line for the introduction of a solution of N-vinylcarbazole in cyclohexane, and an outlet for unreacted vapors. The overflow line was connected to a receiver for the product dispersion. The reaction medium, in this case cyclohexane, was pumped through a column of silica gel and then merged with the inlet stream of polymerization initiator, tin tetrabromide, dissolved in cyclohexane before being brought up to the reaction temperature of 44° C. and introduced into the reactor. The flow rates of the inlet and outlet streams were so adjusted as to produce a product dispersion of approximately 4% by weight of copolymer solids. The input ratios were 0.041 millimole of tin tetrabromide per liter of cyclohexane reaction medium; and 0.00086 mol of N-vinylcarbazole per mol of formaldehyde. A holdup time of about 4.5 minutes proved to be adequate to produce the desired product. The product dispersion was quenched in methanol, filtered, and washed. Based on the inlet formaldehyde, an 85% yield of product was obtained.

The above copolymer product was acetylated by forming a slurry of 0.5% by weight of copolymer solids in a mixture of acetic anhydride and pyridine (9:1 by volume) and refluxing (137° C.) that slurry for 15 minutes in an atmosphere of nitrogen and at a gage pressure of 2 inches of mercury. The acetylated product was filtered, washed with acetone, and dried, producing a 100% weight recovery over this step. The acetylated copolymer product was found to contain 0.29% by weight of N-vinylcarbazole, or 0.46 mol of N-vinylcarbazole per 1000 mols of formaldehyde. The copolymer was found to have a number average molecular weight of about 55,000 and an inherent viscosity of 1.53 measured in phenol as described above.

To the acetylated product was added as a thermal stabilizer 1.0% by weight of a synthetic polyamide terpolymer, and as an antioxidant, 0.3% by weight of 4,4'-butylidene bis(3-methyl-6-tertiary-butyl phenol). The resulting composition was found to have a reaction rate constant for thermal degradation at 259° C. in vacuum of 0.25% by weight per minute. The details of this test are the same as those described in United States Patent 2,768,994 issued to R. N. MacDonald on October 30, 1956, with the exception that the present test is conducted at 259° C. (diphenyl ether vapors as a heating medium) and is conducted in a vacuum. The above composition containing the thermal stabilizer and the antioxidant was extruded into strands and cut into molding powder, which, in turn, was injection molded into test bars. Similar test bars were made from a homopolymer of formaldehyde (polyoxymethylene) of the same molecular weight and containing the same additives as the copolymer. The results of physical tests upon the bars made from the homopolymer and from the copolymer, are as follows:

| | Copolymer | Homopolymer |
|---|---|---|
| Tensile Strength, p.s.i. | 10,100 | 10,300 |
| Ultimate Elongation, Percent | 56 | 52 |
| Flexural Modulus, p.s.i. | 440,000 | 419,000 |

*Example 2*

Substantially the same process as described in Example 1 was employed with a feed ratio of 0.00235 mol of N-vinylcarbazole per 1 mol of formaldehyde, and a catalyst concentration of 0.12 millimole of tin tetrabromide per liter of cyclohexane. The acetylated copolymer product contained 1% by weight of N-vinylcarbazole, or 1.5 mols per 1000 mols of formaldehyde. The acetylated product had an inherent viscosity of 1.28 measured in phenol as described above. The same additives were employed as those of Example 1 and the molded test bars exhibited a tensile strength of 10,200 p.s.i., an ultimate elongation of 39%, a flexural modulus of 520,000 p.s.i., and a melting point substantially the same as that for the homopolymer of formaldehyde. The increase in flexural modulus over that of the homopolymer (24% increase) provides new fields of use for the copolymer because of its higher stiffness.

*Example 3*

Substantially the same process as that described in Example 1 was employed with a feed ratio of 0.010 mol of N-vinylcarbazole per 1 mol of formaldehyde, and a catalyst concentration of 0.12 millimole of tin tetrabromide per liter of cyclohexane. The copolymer product was acetylated by treatment with acetic anhydride. The acetylated copolymer product contained 4.7% by weight of N-vinylcarbazole, or 7.6 mols per 1000 mols of formaldehyde, and had an inherent viscosity of 1.70 measured in phenol as described above. The acetylated copolymer was treated with the thermal stabilizer and the antioxidant described in Example 1 and the resulting composition was compression molded into bars.

When the same polymerization process was employed with a feed ratio of 0.070 mol of N-vinylcarbazole per 1 mol of formaldehyde with a catalyst concentration of 0.12 millimole of tin tetrabromide per liter of cyclohexane, a copolymer was obtained containing 19% by weight of N-vinylcarbazole, or 36 mols per 1000 mols of formaldehyde. After acetylation the copolymer product exhibited an inherent viscosity of 1.06 measured in phenol as described above, and was not moldable under similar conditions of heat and pressure found to be suitable for the copolymer product described above in this example.

*Example 4*

Formaldehyde was copolymerized with N-vinylpyrrolidone in a continuous process employing substantially the same equipment as described in Example 1. The reaction medium, cyclohexane, was introduced into the polymerization reactor mixed with the polymerization initiator, tin tetrabromide, at a temperature of 45° C. The flow rates of the inlet and outlet streams from the reactor were so adjusted as to produce a product dispersion of approximately 3% by weight of copolymer solids. The input ratios were 0.199 mol of N-vinylpyrrolidone per mole of formaldehyde and 0.12 millimole of tin tetrabromide per liter of cyclohexane reaction medium. A holdup time of about 4.5 minutes proved to be adequate to produce the desired product. The product dispersion was quenched in methanol, filtered, and washed. Based on the inlet formaldehyde a 92% yield of product was obtained.

This copolymer product exhibited an inherent viscosity of 0.69 measured in dimethylformamide as described above. This product ws found to contain 3.4% by weight of N-vinylpyrrolidone or 9.4 mols of N-vinylpyrrolidone per 1000 mol of formaldehyde.

The above copolymer product was acetylated according to the process described in Example 1 with a recovery of 90% by weight over this step. The acetylated product contained 1.4% by weight of N-vinylpyrrolidone or 3.8 mols of N-vinylpyrrolidone per 1000 mols of formaldehyde. The acetylated product had an inherent viscosity of 1.38 mesured in phenol as described above.

*Example 5*

Substantially the same process as described in Example 4 was employed with a feed ratio of 0.100 mol of N-vinylpyrrolidone per mol of formaldehyde and a polymerization initiator concentration of 0.060 millimole of tin tetrabromide per liter of cyclohexne. After acetylation, as described in Example 1, the product was found to contain 0.9% by weight of N-vinylpyrrolidone, which is equivalent to 2.5 mols of N-vinylpyrrolidone per 1000 mols of formaldehyde.

The acetylated product had an inherent viscosity of 1.36 measured in phenol as described above. After the addition of 1% by weight of synthetic polyamide terpolymer as a thermal stabilizer and 0.3% by weight of 4,4'-butylidene-bis(3-methyl-6-tertiary-butylphenol), the product was molded into test bars which exhibited a tensile strength of 10,000 p.s.i., an ultimate elongation of 50%, and a flexural modulus of 449,000 p.s.i.

*Example 6*

Substantially the same process as described in Example 1 was employed to copolymerize N-vinylmethylformamide and formaldehyde employing a feed ratio of 0.29 mol of N-vinylmethylformamide per mol of formaldehyde and a concentration of polymerization initiator of 0.12 millimole of tin tetrabromide per liter of cyclohexane. The copolymer product was acetylated as described in Example 3, and the resulting product contained 0.98% by weight of N-vinylmethylformamide, or 3.5 mols per 1000 mols of formaldehyde. The product had an inherent viscosity of 0.77 measured in phenol as described above.

The foregoing examples illustrate specific embodiments of this invention, and it is not intended that the invention be limited to the processes and compositions described therein.

The copolymers of this invention contain from 0.5 to 50 mols of vinyl-nitrogen compound per 1000 mols of formaldehyde and may be represented by the general formulas:

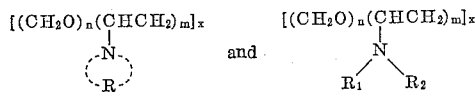

wherein $n$, $m$ and $x$ are positive integers having values such that the ratio of $n/m = 20$ to 2000, and $x$ is sufficiently high that the resultant product is a normally solid thermoplastic material, which is one having an inherent viscosity of at least about 0.6 measured in phenol as described above. R is a divalent cyclic organic radical having 3–12 carbon atoms in the cycle and being connected to the nitrogen in the above formula through two separate and distinct carbon atoms in the cyclic structure of the radical. $R_1$ and $R_2$ are monovalent organic radicals having 1–12 carbon atoms and being selected from the group consisting of alkyl, cycloalkyl, aryl, and the radical having the formula

in which $R_3$ is a monovalent radical selected from the group consisting of hydrogen, alkyl radicals of 1–12 carbon atoms, cycloalkyl radicals of 4–6 carbon atoms, and aryl radicals of 6–12 carbon atoms.

The two comonomers should be susbtantially pure in order to produce the best copolymeric product. Many of the vinyl-nitrogen compounds are available commercially and may be purified, if desired, by distillation or recrystallization, depending on whether the comonomer is a liquid or a solid at room temperature. The formaldehyde may be prepared in an anhydrous state by means of the process described in U.S. Patent 2,848,500 issued August 19, 1958, to D. L. Funck. Other methods of preparing anhydrous formaldehyde are described in the above-cited MacDonald patent U.S. 2,768,994, or by other procedures known to those skilled in the art.

The proportionate amounts of comonomers which are introduced into the reaction zone may vary over rather wide limits, although it has been found desirable when preparing the copolymers of this invention to employ about 0.05 to 25 mols of vinyl-nitrogen compound per 100 mols of formaldehyde.

The reaction medium may be any inert liquid organic solvent for formaldehyde and the vinyl-nitrogen compound. The preferred materials for the reaction medium are the aliphatic, cycloaliphatic, and aromatic hydrocarbons containing 3–10 carbon atoms per molecule. Especially desirable solvents are cyclohexane, heptane, and toluene.

The polymerization initiator employed in the process of this invention is any of the Friedel-Crafts metal halide catalysts, e.g., the halides of boron, aluminum, tin, antimony, and the like. The more desirable of these catalysts has been found to be tin tetrabromide, tin tetrachloride and boron trifluoride, since these materials are more active in the present process than are the other catalysts of this group. The amount of initiator which is employed in this process may vary from about 0.001 to 5.0 millimoles per liter of reaction medium, although it is preferable to employ about 0.005 to 2.0 millimoles per liter. Generally, less amounts of tin tetrabromide or tin tetrachloride are required than boron trifluoride.

The reaction temperature and pressure are not critical since room temperature and atmospheric pressure are operable in this process as well as high temperatures or low temperatures at subatmospheric or superatmospheric pressures. Because of convenience, it is preferred to operate at atmospheric pressure and to employ temperatures of about 0°–75° C., although broader limits of temperature may be from about −80° C. to +100° C. The products of this invention are useful in the preparation of molded or extruded shaped articles such as fibers, filaments, films, sheets, rods, tubes, pipe, and other injection-molded or extrusion-molded articles. Some portions of the product may be soluble and these portions are particularly useful as a component of finishes. The product has the general appearance and properties of the polyoxymethylene plastics, although, depending upon the amount and kind of the vinyl-nitrogen comonomer employed, the copolymer becomes more, or less, flexible than the homopolymer of formaldehyde. The copolymers may be made more thermally stable by incorporating ester groups or ether groups at the end of any polymer chain which terminates with a formaldehyde unit and the copolymer may be modified by the addition of antioxidants, fillers, pigments, and the like.

I claim:
1. A normally solid, thermoplastic copolymer of formaldehyde and a polymerizable compound selected from the group consisting of vinyl monomers having the formulas:

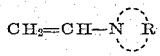

and

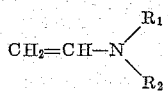

where R is a divalent cyclic organic radical having 3–12 carbon atoms and being connected to the nitrogen of the above formula through two separate and distinct carbon atoms; and wherein $R_1$ and $R_2$ are selected from the group of monovalent organic radicals having 1–12 carbon atoms consisting of alkyl, cycloalkyl, aryl, and the radical having the formula $$R_3\overset{O}{\underset{\|}{C}}-$$

in which $R_3$ is selected from the group of monovalent radicals consisting of hydrogen, alkyl radicals of 1–12 carbon atoms, cycloalkyl radicals of 4–6 carbon atoms, and aryl radicals of 6–12 carbon atoms, said copolymer containing 0.5 to 50 mols of the said vinyl monomer per 1000 mols of formaldehyde.

2. A normally solid thermoplastic copolymer of 0.5 to 50 mols of N-vinylcarbazole per 1000 mols of formaldehyde.

3. A normally solid thermoplastic copolymer of 0.5 to 50 mols of N-vinylpyrrolidone per 1000 mols of formaldehyde.

4. A normally solid, thermoplastic copolymer of 0.5 to 50 mols of N-vinylmethylformamide per 1000 mols of formaldehyde.

5. A shaped article made from the composition of claim 1.

6. A process for preparing a copolymer of formaldehyde and a comonomer selected from the group consisting of vinyl-nitrogen compounds having the formula:

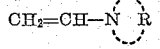

and

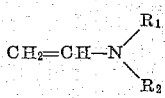

wherein R is a divalent cyclic organic radical having 3–12 carbon atoms and being connected to the nitrogen of the above formula through two separate and distinct carbon atoms in the cyclic structure of the radical, and wherein $R_1$ and $R_2$ are selected from the group of monovalent organic radicals having 1–12 carbon atoms consisting of alkyl, cycloalkyl, aryl, and the radical having the formula $$R_3\overset{O}{\underset{\|}{C}}-$$

in which $R_3$ is selected from the group of monovalent radicals consisting of hydrogen, alkyl radicals of 1–12 carbon atoms, cycloalkyl radicals of 4–6 carbon atoms, and aryl radicals of 6–12 carbon atoms; the process comprising contacting substantially anhydrous formaldehyde and said vinyl-nitrogen compound in an inert liquid hydrocarbon in the presence of a Friedel-Crafts metal halide catalyst at a temperature of $-80°$ C. to $+100°$ C. for a time sufficient to permit copolymer particles to form, and thereafter recovering said copolymer containing 0.5 to 50 mols of said vinyl-nitrogen comonomer per 1000 mols of formaldehyde.

7. The process of claim 6 in which the relative amounts of said comonomer and formaldehyde which are contacted are 0.5 to 500 mols of comonomer per 1000 mols of formaldehyde.

8. The process of claim 7 in which said catalyst is tin tetrabromide which is present in the amount of 0.001 to 5.0 millimoles per liter of said liquid hydrocarbon.

References Cited by the Examiner

UNITED STATES PATENTS

| 2,484,423 | 10/49 | Reynolds | 260—89.7 |
| 2,526,638 | 10/50 | Cupery | 260—63 |
| 3,027,352 | 5/62 | Walling et al. | 260—67 |
| 3,037,963 | 6/62 | Christenson | 260—73 |
| 3,076,786 | 2/63 | Brown et al. | 260—73 |

WILLIAM H. SHORT, *Primary Examiner.*

MILTON STERMAN, LOUISE P. QUAST, *Examiners.*